(12) United States Patent
McAliley

(10) Patent No.: US 6,676,168 B2
(45) Date of Patent: Jan. 13, 2004

(54) METHODS FOR INSTALLING HOLLOW FITTINGS IN VESSEL WALLS AND A HOLLOW FITTING ASSEMBLY THEREFOR

(76) Inventor: J. Eugene McAliley, 2445 Shiland Dr., Rock Hill, SC (US) 29732

( * ) Notice: Subject to any disclaimer, the term of this patent is extended or adjusted under 35 U.S.C. 154(b) by 11 days.

(21) Appl. No.: 10/103,724

(22) Filed: Mar. 25, 2002

(65) Prior Publication Data

US 2003/0178843 A1 Sep. 25, 2003

(51) Int. Cl.[7] ................................................. F16L 5/00
(52) U.S. Cl. ...................... 285/206; 285/39; 285/139.2; 29/890.14
(58) Field of Search ............................... 285/18, 37, 39, 285/139.1, 139.2, 139.3, 201, 204, 205, 206, 207, 208; 29/890.14, 255, 256, 282

(56) References Cited

U.S. PATENT DOCUMENTS

| | | | |
|---|---|---|---|
| 309,975 A | * 12/1884 | Nicolai | ........................ 138/89 |
| 803,687 A | 11/1905 | Grotewohl | |
| 978,504 A | 12/1910 | Stewart | |
| 1,049,283 A | 12/1912 | Westphal | |
| 1,364,814 A | 1/1921 | Saucke | |
| 1,809,250 A | * 6/1931 | Pendleton | ................... 285/206 |
| 2,704,426 A | 3/1955 | Macaulay | |
| 2,819,915 A | * 1/1958 | Woodson | ................... 285/206 |
| 2,907,242 A | * 10/1959 | Chakroff | ..................... 285/39 |
| 3,033,514 A | 5/1962 | Grosch | |
| 3,246,132 A | * 4/1966 | Jordan et al. | ............ 285/139.2 |
| 3,415,285 A | * 12/1968 | Torp | ..................... 285/148.19 |
| 3,751,999 A | 8/1973 | Jollivet | |
| 4,622,730 A | 11/1986 | Steinbock | |
| 4,874,189 A | * 10/1989 | Gardner | ........................ 285/39 |
| RE33,490 E | 12/1990 | Steinbock | |
| 5,094,490 A | * 3/1992 | Shirey | ........................ 285/39 |
| 5,690,368 A | * 11/1997 | Johnson | ...................... 285/205 |
| 5,934,853 A | 8/1999 | Junkers | |
| 5,967,567 A | * 10/1999 | Nordstrom | ............... 285/139.1 |
| 5,988,699 A | * 11/1999 | Quandt | .................... 285/142.1 |
| 6,464,260 B1 | * 10/2002 | Barrier | ........................ 285/39 |

FOREIGN PATENT DOCUMENTS

| | | | | |
|---|---|---|---|---|
| JP | 5272683 | * | 10/1993 | .................. 285/39 |
| JP | 6185686 | * | 7/1994 | ................. 285/206 |

* cited by examiner

Primary Examiner—David Bochna
(74) Attorney, Agent, or Firm—Burns, Doane, Swecker & Mathis, L.L.P.

(57) ABSTRACT

A hollow fitting assembly is secured with a pressure-tight seal in a hole which is disposed in a curved wall of a vessel. A body barrel portion of a hollow body element is inserted through the hole from a concave side of the vessel wall. A force-distributing washer is inserted over the free end of the body barrel portion such that a concave face of the washer faces the hole, and a flat face of the washer faces away from the hole. A pusher flange is screwed onto the free end of the body barrel portion. Jack bolts are screwed into internally threaded apertures of the pusher flange and are brought into abutting relationship with the flat face of the washer so that upon tightening of the jack bolts, a flange portion of the hollow fitting compresses a seal ring against the concave side of the vessel wall to form a pressure-tight seal around the hole. An externally threaded hollow connection member is attached to a threaded interior of the body barrel portion.

13 Claims, 5 Drawing Sheets

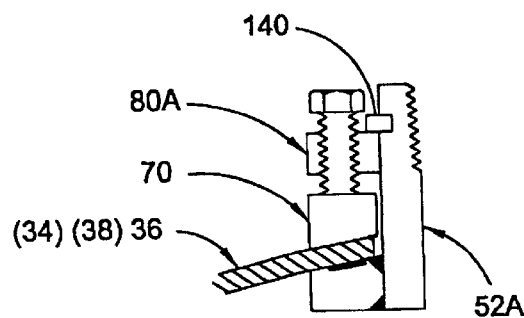
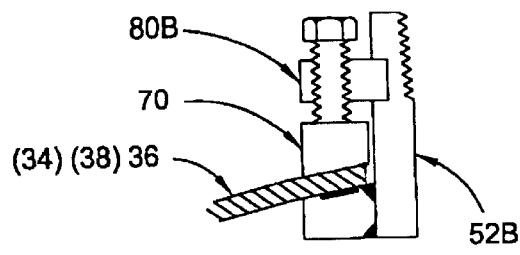
FIG. 10  FIG. 11
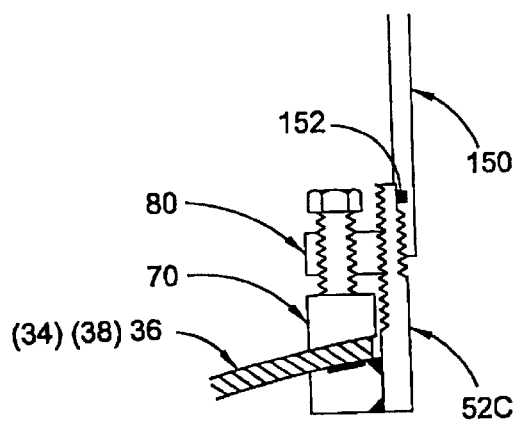
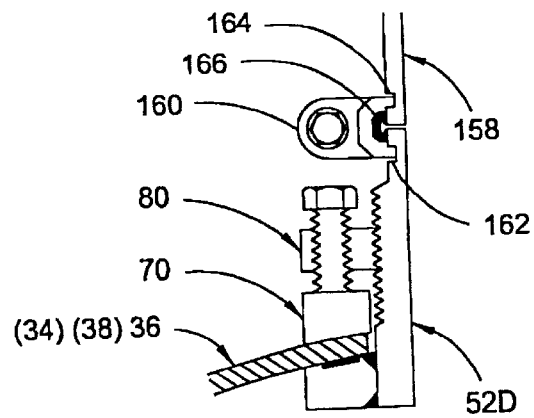
FIG. 12  FIG. 13

METHODS FOR INSTALLING HOLLOW FITTINGS IN VESSEL WALLS AND A HOLLOW FITTING ASSEMBLY THEREFOR

BACKGROUND OF THE INVENTION

The present invention relates to the installation of hollow fittings in vessels, especially vessels used to contain flammable substances.

Certain industrial facilities require the storage of large quantities of chemicals, which is typically done by the use of large cylindrical vessels arranged adjacent one another in a storage area, i.e., a so-called tank farm. On occasion, one or more of the vessels may need to have an additional opening formed in a cylindrical side wall, a domed top wall, or a domed bottom wall of the vessel, e.g., for venting purposes. Typically, this is done by torch cutting a hole in the wall and then electric arc welding a hollow fitting in the hole. The hollow fitting typically includes a flanged end to enable external connectors to be connected thereto.

Special concerns exist in cases where the vessels are used to store highly flammable materials, because sparks generated by welding could generate an explosion. Even though the vessel to be modified is first emptied and cleaned, a spark could still ignite adjacent vessels. It would be highly time consuming and expensive to empty every vessel, however.

Conventional torch cutting and electric arc welding methods create a substantial ignition source which could ignite a fire or explosion when performed near vessels that store highly flammable materials.

Hole-cutting procedures are known which are flameless and sparkless, e.g., abrasive water jet cutting, and which could be used to cut a hole in a vessel, but the subsequent attachment of the hollow fitting in the hole by electric arc welding would create a dangerous ignition source.

Also, hollow fittings are known, such as the bulkhead fitting 10 shown in FIG. 1, which are used on flat plates, and can be attached to a hole in a plate by an all-screwed construction which eliminates the need for electric arc welding. The bulkhead fitting 10 is inserted through a hole in the flat plate 12 and is secured by a main nut 14 which threads onto the outside of a body barrel 16 of the bulkhead fitting. The interior of the body barrel 16 has a screw thread (not shown) to receive an external connector 17. A gasket 18 is compressed between the plate 12 and a body flange 20 of the bulkhead fitting 10 to create a pressure-tight seal around the hole. Aside from the fact that the bulkhead fitting 10 is not capable of being attached to a curved vessel wall, two other problems occur that make large bulkhead fittings 10 such as three-inch in diameter, or larger, unsuitable for most industrial applications.

The primary problem with large bulkhead fittings 10 is that the main nut 14 cannot be tightened sufficiently to produce the large force need to compress typical industrial gaskets. The main nut 14 wastes most of the tightening torque in overcoming the friction force between the face of the main nut 14 and the surface of the vessel wall 12. For example a six-inch diameter bulkhead fitting would require an eight-foot long wrench with a force of about sixteen hundred pounds applied to the end thereof to adequately compress a typical industrial gasket. Of course tightening conditions in this example are substantially impractical for industrial use.

Because of the problem with tightening the main nut 14, bulkhead fittings 10 are commercially available mostly for rubber gaskets, and smaller sizes about four inches in diameter and smaller. Bulkhead fittings are unsuitable for most industrial applications because rubber gaskets have limitations of temperature and chemical resistance. Typical industrial gaskets made from compressed fiber sheet or spiral windings will not work with large bulkhead fittings because the minimum sealing stress for such industrial gaskets is about ten times higher than the sealing stress required for rubber gaskets.

A secondary problem associated with large bulkhead fittings 10 is that it is relatively difficult to hold the body barrel 16 against rotation while tightening the main nut 14.

Accordingly, it would be desirable to enable a hollow fitting to be attached to a vessel wall in a pressure-tight manner without the need for spark producing methods such as torch cutting or electric arc welding.

It would also be desirable to enable a hollow fitting to be attached to a vessel wall in a pressure-tight manner using small, easily manipulated wrenches.

It would be further desirable to enable a hollow fitting to be attached to a vessel wall in a pressure-tight manner without having to hold the body barrel against rotation.

SUMMARY OF THE INVENTION

One aspect of the present invention relates to a method of installing a hollow fitting assembly with a pressure-tight seal in a hole disposed in a wall of a vessel. The method comprises the steps of:

A) inserting a hollow body element through the hole from a first side of the wall such that a free end of a body barrel portion of the hollow body element protrudes from a second side of the wall, and a body flange portion of the hollow body element bears against the first side, with a seal ring interposed between the body flange portion and the first side, the seal ring extending around the hole to form a pressure-tight seal;

B) inserting a force-distributing washer over the free end of the body barrel portion such that a first face of the washer faces toward the hole, and a second face of the washer faces away from the hole;

C) inserting a pusher flange onto the free end of the body barrel portion and attaching the pusher flange to the body barrel;

D) screwing jack bolts within internally threaded apertures formed in the pusher flange, causing free ends of the jack bolts to abut the second face of the force-distributing washer to push the first face of the washer toward the second side of the wall, and pull the body flange portion toward the first side of the wall for compressing the seal ring to form a pressure tight seal around the hole; and E) attaching an external member to the body barrel portion.

Another aspect of the present invention relates to a vessel which includes a wall having a hole formed therethrough, and a hollow fitting assembly installed with a pressure-tight seal in the hole. The hollow fitting assembly comprises a hollow body element which includes a body flange portion bearing against a first side of the wall, with a seal ring disposed between the body flange portion and the first side. The seal ring extends around the hole to form a pressure-tight seal. The hollow body element further includes a hollow body barrel portion extending through the hole from the body flange portion. A pusher flange is attached to the body barrel portion. A force-distributing washer is disposed between the pusher flange and the second side of the wall, with a first face of the washer facing the second side, and a second face of the washer facing away from the second side. Jack bolts are threadedly secured within internally threaded apertures of the pusher flange, with free ends of the jack bolts pushing the force-distributing washer against the second side, and with threaded portions of the jack bolts forcing the pusher flange away from the vessel to pull the body flange portion toward the first side for compressing the seal ring to create a pressure-tight seal around the hole.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIG. 10 is a fragmentary cross-sectional view of a first alternative way of connecting the pusher flange to a hollow body element.

FIG. 11 is a fragmentary cross-sectional view of a second alternative way of connecting the pusher flange to the hollow body element.

FIG. 12 is a fragmentary cross-sectional view of a first alternative way of connecting an external member to the hollow body element.

FIG. 13 is a fragmentary cross sectional view of a second alternative way of connecting an external member to the hollow body element.

DETAILED DESCRIPTION OF PREFERRED EMBODIMENTS OF THE INVENTION

Figure 1:
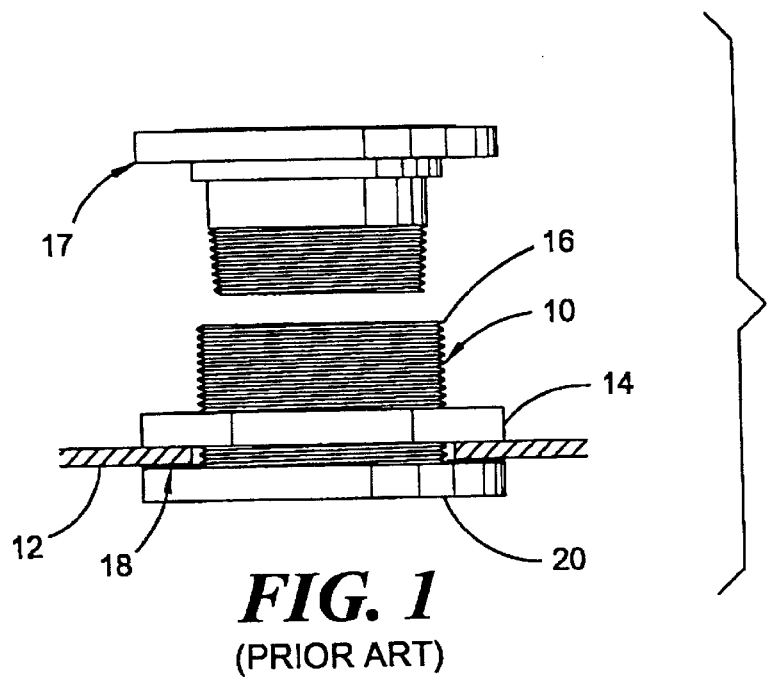
FIG. 1 is a sectional view taken through a flat plate showing a conventional bulkhead fitting assembly in an exploded view.
Figure 2:
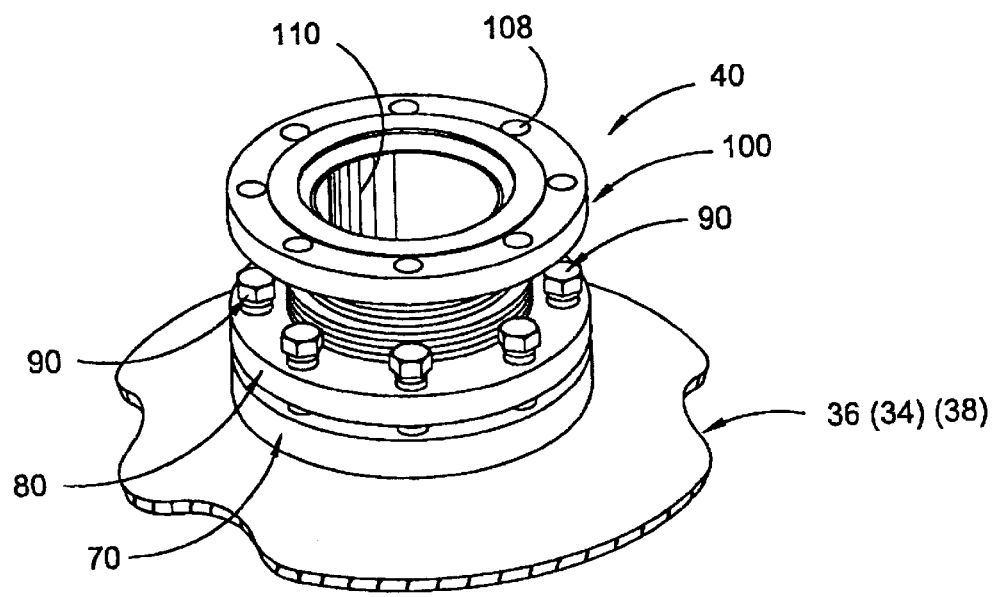
FIG. 2 is a perspective view of a hollow fitting assembly according to the present invention attached to a vessel wall, the hollow fitting being viewed from outside of the vessel.
Figure 3:
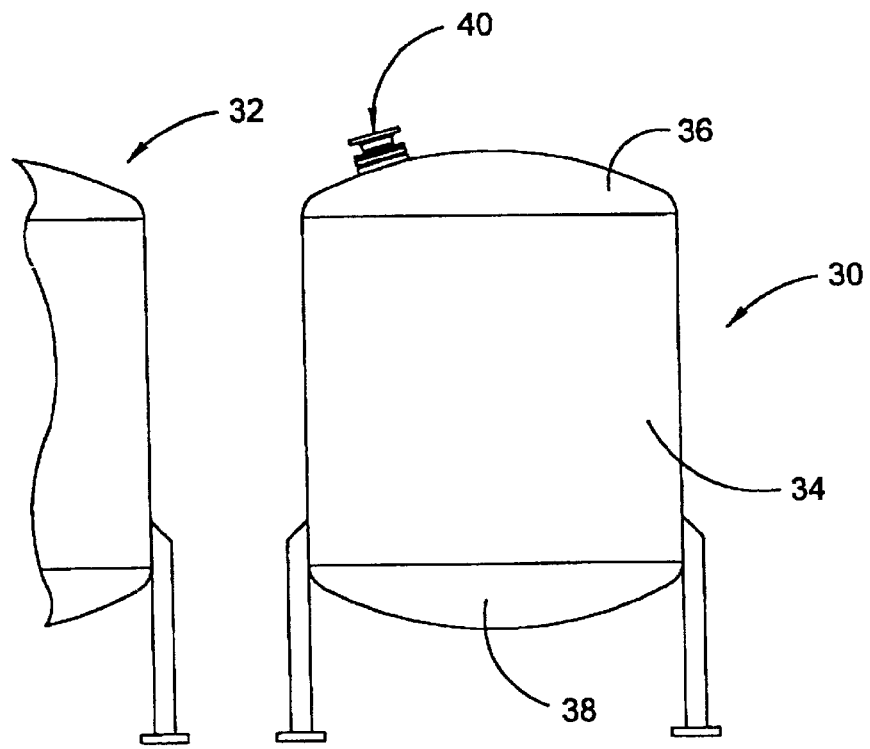
FIG. 3 is a schematic side elevational view of a pair of vessels, with a hollow fitting assembly according to the present invention mounted in one of the vessels.
Figure 4:
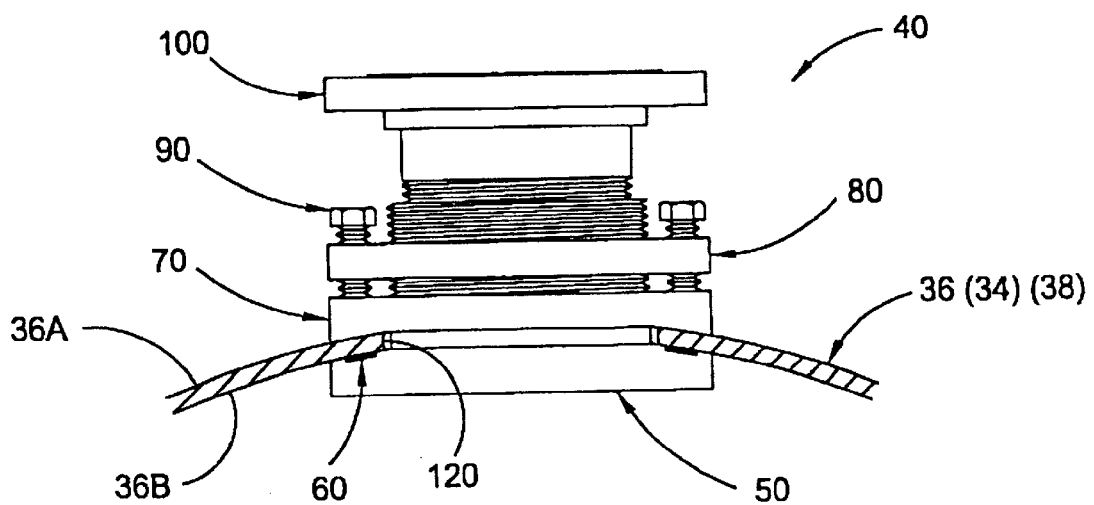
FIG. 4 is a sectional view taken through a curved wall of the vessel of FIG. 3, depicting a hollow fitting assembly according to the present invention in an assembled state.
Figure 5:
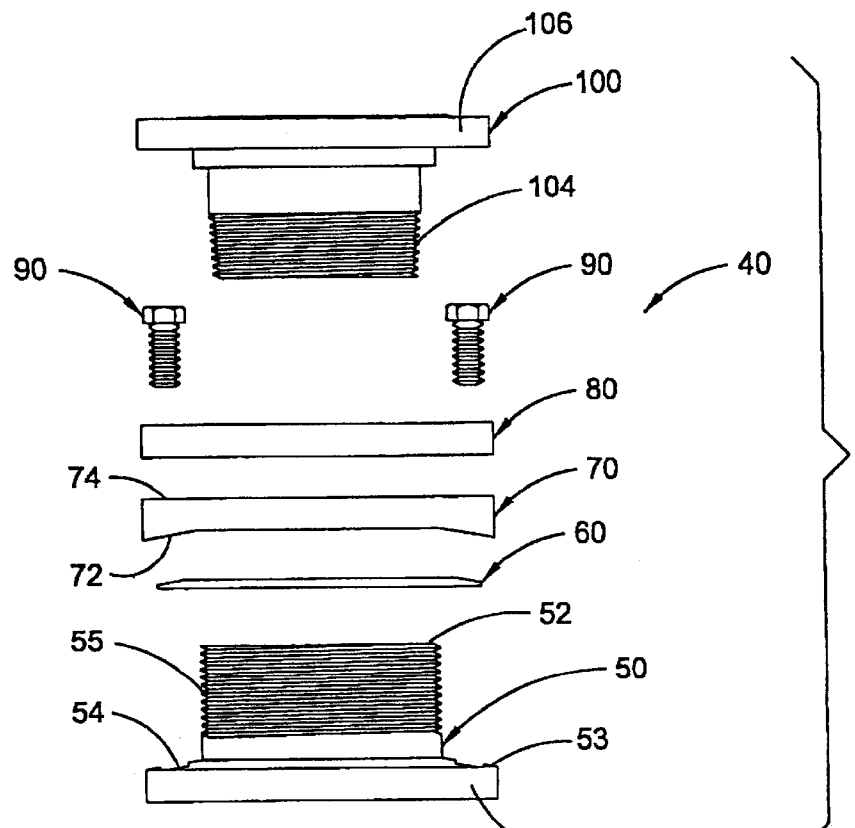
FIG. 5 is an exploded side view of the hollow fitting assembly according to the present invention.

Depicted in FIG. 3 are vessels 30, 32 arranged adjacent one another, each vessel including a cylindrically curved side wall 34 and top and bottom walls 36, 38 which are curved, preferably dome-shaped. Installed in one of the curved walls, e.g., the top wall 36 of the vessel 30, is a hollow fitting assembly 40 according to the present invention. It should be appreciated, however, that the present invention is also applicable to the installation of the fitting assembly in a flat wall.

Figure 6:
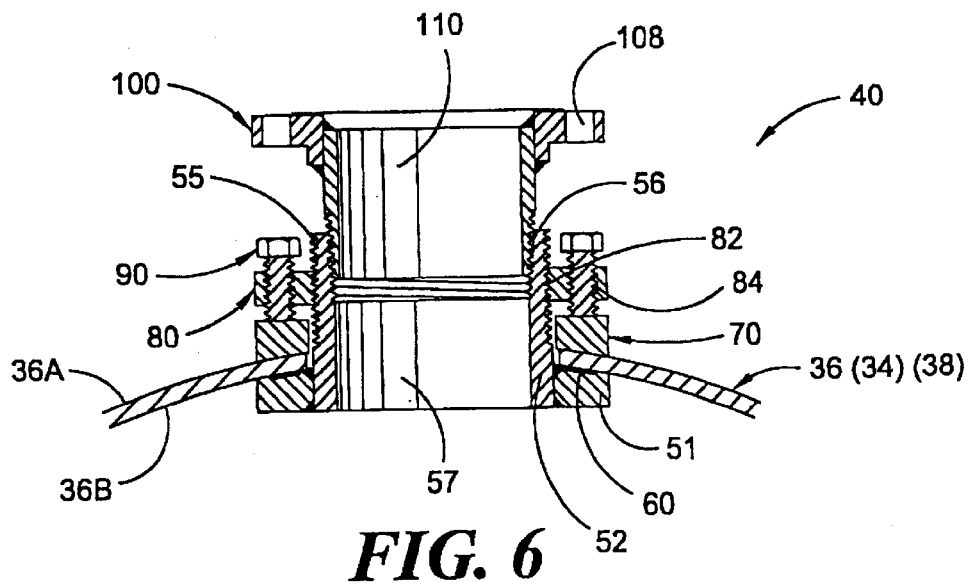
FIG. 6 is a longitudinal sectional view taken through the hollow fitting assembly according to the present invention.

The hollow fitting assembly 40, depicted more clearly in FIGS. 2 and 4–6, includes a hollow body element 50, a seal ring 60, a force-distributing washer 70, a pusher flange 80, jack bolts 90, and an external member 100. The hollow body element 50 includes a body flange portion 51 and a body barrel portion 52 welded to the body flange portion. The body flange portion 51 includes a generally convex surface 53 having an annular recess 54 formed therein. The body barrel portion 52 includes external and internal threads 55, 56, respectively. As can be seen in FIG. 6, the hollow body element 50 forms a central passage 57.

The seal ring 60 comprises a generally flat ring sized to fit within the recess 54 of the body flange portion 51. It will be appreciated that a seal of any suitable cross sectional shape, e.g., rectangular or circular, could be employed.

The force-distributing washer 70 includes a generally concave face 72 and an opposite, generally flat face 74.

The pusher flange 80 includes an internal thread 82 and a plurality of threaded through-apertures 84 arranged in circumferentially spaced relationship about a center hole of the pusher flange.

The jack bolts 90 are sized to be threadedly received in respective ones of the through-apertures.

The external member 100 can comprise a connector, a sight glass, an agitator, piping or any other suitable piping, equipment, and instruments. The depicted external member 100 is a screwed, flanged nozzle which is hollow and includes an externally threaded connector nipple 104 and a connector flange 106 having apertures 108 formed therein. A central passage 110 is thus formed which is aligned with the passage 57 once the parts of the hollow fitting assembly have been interconnected.

The parts of the hollow fitting assembly are interconnected on-site after a vessel 30 has been prepared by being emptied and cleaned. A hole 120 (FIG. 4) is formed in a curved wall of the vessel 30. If the vessel 30 is located adjacent another vessel 32, or process equipment, which contains a flammable material, the hole 120 is formed by a sparkless technique, such as abrasive water jet cutting. Then, the body barrel portion 52 of the hollow body element 50 is inserted through the hole 120 from within the vessel, so that the free end of the body barrel portion 52 faces away from a convex outer side 36A of the vessel wall 36. The convex surface 53 of the body flange portion 51 of the hollow body element (with the seal ring 60 secured in the recess 54 thereof faces a concave side 36B of the vessel wall 36.

The force-distributing washer 70 is then inserted over the free end of the body barrel portion 52 such that the concave face 72 of the washer 70 faces the hole 120, and the flat face 74 thereof faces away from the convex side 36A of the vessel wall 36.

The pusher flange 80 is then screwed onto the free end of the body barrel portion 52 and is advanced along the external screw thread 55, but is not tightened against the washer 70. Thereafter, the jack bolts 90 are screwed into the internally threaded apertures 84 of the pusher flange 80 to cause free ends of the jack bolts 90 to abut the flat face 74 of the force-distributing washer 70.

In response to a further tightening of the jack bolts 90, the washer 70 and the pusher flange 80 are urged away from one another. Accordingly, the concave face 72 of the washer 70 is pushed against the convex side 36A of the vessel wall 36, and the body flange portion 51 is pulled toward the concave side 36B of the vessel wall. The washer 70 serves to effectively distribute the forces applied by the jack bolts 90. The wall 36 thus becomes clamped between the washer 70 and the body flange portion 51, with the seal ring 60 compressed to form a pressure-tight seal around the hole 120. It will be appreciated that the force-distributing washer 70 must be thick enough (i.e., strong enough) to be able to effectively distribute the forces applied by the jack bolts 90. The jack bolts 90 do not have to be uniformly spaced around the periphery of the pusher flange 80; an irregular spacing could be employed.

Then, the external connector member 100 is screwed into the body barrel portion 52. Other members, such as valves, conduits, etc., can be attached to the external connector member 100 by utilizing the holes 108.

It will be appreciated that it is relatively easy to tighten the jack bolts 90, and that it is not necessary to hold the hollow body element 50 against rotation while tightening the jack bolts 90.

The use of the jack bolts of the present invention has solved the primary problem associated with tightening a large bulkhead fitting. The jack bolts can be easily tightened with small wrenches to produce the high forces needed to compress typical industrial gaskets. For example, tightening a six-inch diameter prior art bulkhead fitting would require an eight-foot long wrench with about sixteen hundred pounds of force applied at the end. By comparison, a six-inch diameter hollow fitting of the present invention would require only a two-foot long wrench with about one hundred pounds of force applied at the end thereof.

Additionally, the use of the jack bolts of the present invention has solved the secondary problem with large bulkhead fittings in that it is not necessary to hold the hollow body element against rotation while tightening the jack bolts.

Another advantage of the present invention relates to the strength of the vessel wall surrounding the hole 120. In that regard, several recognized standards for vessel construction require that stiffening structural members be added to the vessel wall around holes where external connectors are attached. Typically the external connectors are flanged nozzles electric arc welded to the hole. The stiffeners are typically doughnut shaped metal plates electric arc welded around the hole.

The hollow fitting of the present invention provides adequate structural stiffening for the vessel wall for the following two reasons:

1) The body flange 51 and the force-distributing washer 70 are sufficiently thick (i.e., strong) to provide adequate stiffening support to the vessel wall around the hole.

2) The jack bolts exert a large clamping force on the vessel wall around the hole (about 220,000 pounds for a six-inch diameter fitting, and about 460,000 pounds for a twelve-inch diameter fitting). This clamping force holds the hollow fitting on the vessel wall by metal-to-metal contact friction between surfaces 36A and 72, and between surfaces 36B and 53 as shown in FIG. 6 which can have the holding power equivalent to a welded connection.

Figure 7:
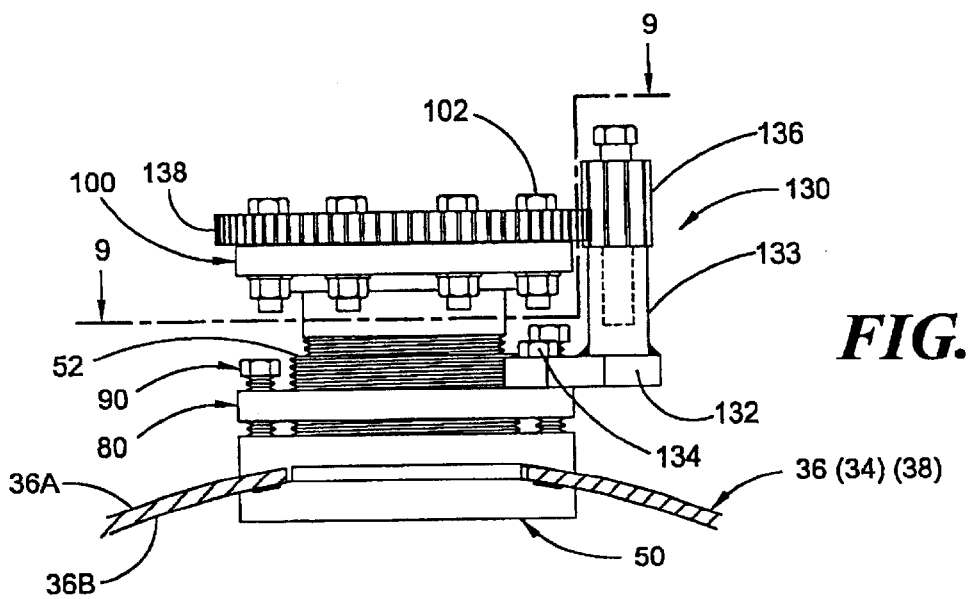
FIG. 7 is a side elevational view through the hollow fitting assembly of FIG. 4, with a tightening mechanism attached thereto for tightening the external connector member of the hollow fitting assembly.
Figure 8:
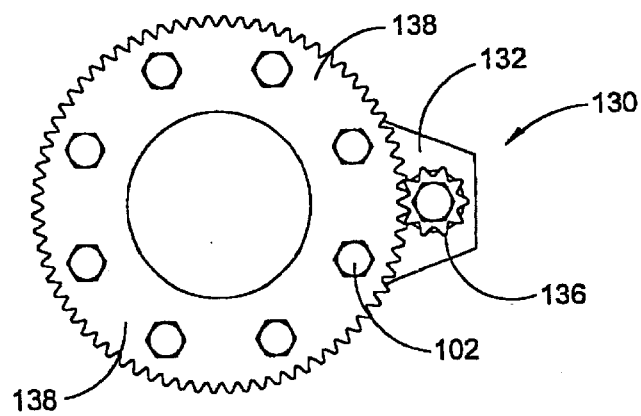
FIG. 8 is an end view of FIG. 7, looking toward the vessel.
Figure 9:
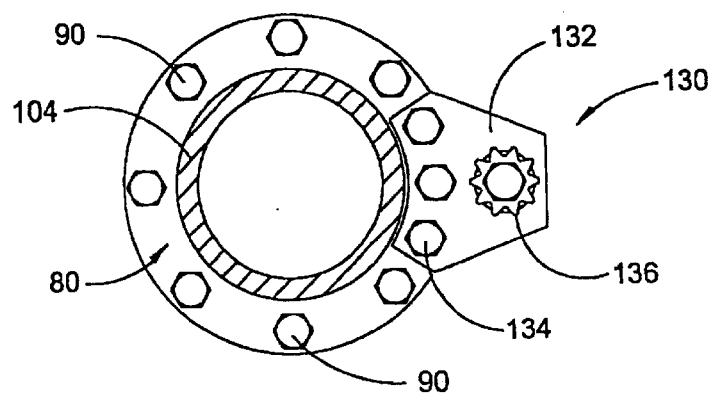
FIG. 9 is a sectional view taken along the line 9—9 in FIG. 7.

In order to facilitate tightening of the external connector member 100, a tightening mechanism 130 disclosed in connection with FIGS. 7–9 can be employed. That tightening mechanism 130 includes a base plate 132 that is attached directly to the pusher flange 80, e.g., by bolts 134 disposed in apertures of the pusher flange. Upstanding from the base plate 132 is a post 133 on which a drive gear 136 is rotatably mounted. That drive gear 136 meshes with a driven gear 138 that is attached to the external connector member 100 by bolts 102 that extend through the holes 108 formed in the external connector member 100. The driven gear 138 has a larger diameter than the drive gear 136, so that by rotating the drive gear 136, e.g., by a small wrench (not shown) a mechanical advantage is achieved for tightening the external connector member 100, thereby avoiding the need for using a large wrench. Once the external connector 100 member has been tightened, the base plate 132, together with the drive gear 136, is removed by unfastening the bolts 134, and the driven gear 138 is removed.

It should be appreciated that although the tightening mechanism 130 has sufficient mechanical advantage for tightening the connector nipple 104, the tightening mechanism 130 lacks the mechanical advantage needed to tighten the main nut 14 on a large prior art bulkhead fitting 10.

It will be appreciated that the present invention enables a hollow fitting assembly to be secured to a curved wall of a vessel without the need for torch cutting or electric arc welding which would create a dangerous ignition source which could ignite a fire or explosion. By avoiding a dangerous ignition source there is no need to evacuate the contents of an adjacent vessel that might contain a flammable material.

While the pusher flange 80 has been described as connected to the body barrel portion 52 by screw threads, any suitable connection could be utilized. For example, a pusher flange 80A shown in FIG. 10 is slid over a smooth outer surface of a body barrel portion 52A and retained by a split retainer ring 140 that is secured in a groove formed in the outer surface of the body barrel portion 52A.

Alternatively, as shown in FIG. 11, the pusher flange 80B could itself be in the form of a split retainer ring that is attached within a groove formed in the outer surface of the body barrel portion 52B.

The seal ring 60 that is employed is preferably a conventional spiral-wound gasket which is available for example, from Garlock® Sealing Technologies of Houston, Tex. Such a gasket is able to withstand high stress and still fill-in minute irregularities present in the vessel wall. Such a gasket is formed of a winding metal of steel or stainless steel and a filler material of Teflon®, graphite, or ceramic.

Alternatively, the gasket could be in the form of a compressed fiber sheet, also available from Garlock® Sealing Technologies, which would not require a groove 54 in the body flange portion 51.

Of course rubber sheet and rubber O-ring gaskets could be used if temperature and chemical resistance conditions would permit the use thereof.

While the body flange portion 51 has been shown as circular, it could instead be oval, wherein the short dimension of the oval is small enough to pass through the long dimension of an oval hole which, like the circular hole, is defined by a cornerless surface.

Although it has been disclosed that the body barrel portion 52 is attached to an external connector member 100, which in turn is connected to a conduit, the body barrel portion 52C could, instead, be directly connected to the conduit 150 (or other equipment), as shown in FIG. 12. An O-ring seal 152 is provided between the conduit 150 and the body barrel portion 52C.

Also, the external connector member 100 need not be connected to the body barrel portion 52 by threads; other couplings such as a suitable conventional Victaulic® clamp 160 could be employed instead, as shown in FIG. 13. That clamp 160 would engage grooves 162, 164 formed in the body barrel portion 52D and the conduit 158, respectively, with a gasket 166 interposed therebetween.

The components 50, 70, 80, and 100 of the fitting assembly can be formed of any suitable material, such as metal, plastic, and fiber reinforced plastic.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A metallic vessel including a wall having a cornerless hole formed therethrough, and a hollow fitting assembly installed with a pressure-tight seal in the hole for connection to an external member, the hollow fitting assembly comprising:
   a hollow body element including a metallic body flange portion bearing against a first side of the wall to form metal-to-metal contact between the body flange portion and the first side, with a seal ring disposed in an annular recess of the body flange portion and compressed between the body flange portion and the first side, the seal ring extending around the hole, the hollow body element further including hollow body barrel portion having a circular cross section and and extending through the hole from the body flange portion;
   a pusher flange attached to an outer surface of the body barrel portion;
   a force-distributing metallic washer disposed between the pusher flange and a second side of the wall, with a first face of the washer facing the second side, and a second face of the washer facing away from the second side;
   jack bolts threadedly secured within internally threaded apertures of the pusher flange, with free ends of the jack bolts pushing the washer against the second side, and with threaded portions of the jack bolts forcing the pusher flange away from the vessel to pull the body flange portion toward the first side for compressing the seal ring to create a pressure-tight seal around the hole.

2. The vessel according to claim 1 wherein the vessel wall is curved, the first and second sides of the wall comprising concave and convex sides respectively, the first face of the washer being concave, and the second face of the washer being flat, a surface of the body flange that engages the concave side being convexly curved.

3. The vessel according to claim 1 wherein the pusher flange is threadedly attached to the outer surface of the body barrel portion.

4. The vessel according to claim 1 wherein the pusher flange is connected to the outer surface of the body barrel portion by a retaining ring mounted in a groove formed in the outer surface of the body barrel portion.

5. The vessel according to claim 1 wherein the pusher flange comprises a ring mounted in a groove formed in the outer surface of the body barrel portion.

6. The vessel according to claim 1 further including a hollow external member attached to the body barrel portion.

7. The vessel according to claim 6 wherein the hollow external member is threadedly attached to an internal thread of the body barrel portion.

8. A vessel including a wall having a hole formed therethrough, and a hollow fitting assembly installed with a pressure-tight seal in the hole, the hollow fitting assembly comprising:
   a hollow body element including a body flange portion having a convex surface bearing against a concave side of the wall, with a seal ring disposed between the body flange portion and the concave side, the seal ring extending around the hole within an annular recess formed in the convex surface, the hollow body element further including an externally threaded body barrel portion extending through the hole from the body flange portion, the body barrel portion forming a first passage;
   a pusher flange screwed onto an external thread of the body barrel portion;
   a force-distributing washer disposed between the pusher flange and a convex side of the wall, with a generally concave face of the washer facing the convex side, and a generally flat face of the washer facing away from the convex side;
   jack bolts threadedly secured within internally threaded apertures of the pusher flange with free ends of the jack bolts pushing the generally concave face of the washer against the convex side, and with threaded portions of the jack bolts forcing the pusher flange away from the vessel to pull the body flange portion toward the concave side for compressing the seal ring to create a pressure-tight seal around the hole; and
   a hollow external connector member threadedly attached to an internal thread of the body barrel portion.

9. A method of installing a hollow fitting assembly with a pressure-tight seal in a hole disposed in a wall of a vessel comprising the steps of:
   A) inserting a hollow body element through the hole from a first side of the wall such that a free end of a body barrel portion of the hollow body element protrudes from a second side of the wall, and a body flange portion of the hollow body element bears against the first side, with a seal ring interposed between the body flange portion and the first side, the seal ring extending around the hole;
   B) inserting a force-distributing washer over the free end of the body barrel portion such that a first face of the washer faces toward the hole, and a second face of the washer faces away from the hole;
   C) attaching a pusher flange to the body barrel portion;
   D) screwing jack bolts within internally threaded apertures formed in the pusher flange, and causing free ends of the jack bolts to abut the second face of the washer to push the first face of the washer toward the second side of the wall, and pull the body flange portion toward the first side of the wall for compressing the seal ring to form a pressure-tight seal around the hole; and
   E) screwing an externally threaded portion of an external member to an internal thread of the body barrel portion by attaching a first gear to the external member, attaching a tightening mechanism to the pusher flange such that a second gear of the tightening mechanism meshes with the first gear, and rotating the second gear with a tool to rotate the first gear and the external member.

10. The method according to claim 9 wherein the vessel is disposed adjacent to at least one member containing a flammable substance, and steps A–D are performed in connection with the vessel without emptying the flammable substance from the adjacent member.

11. A vessel including a wall having a hole formed therethrough, and a hollow fitting assembly installed with a pressure-tight seal in the hole for connection to an external member, the hollow fitting assembly comprising:
   a hollow body element including a body flange portion bearing against a first side of the wall, with a seal ring disposed between the body flange portion and the first side, the seal ring extending around the hole, the hollow body element further including hollow body barrel portion extending through the hole from the body flange portion;

a pusher flange attached to an outer surface of the body barrel portion;

a force-distributing washer disposed between the pusher flange and a second side of the wall, with a first face of the washer facing the second side, and a second face of the washer facing away from the second side;

jack bolts threadedly secured within internally threaded apertures of the pusher flange, with free ends of the jack bolts pushing the washer against the second side, and with threaded portions of the jack bolts forcing the pusher flange away from the vessel to pull the body flange portion toward the first side for compressing the seal ring to create a pressure-tight seal around the hole;

wherein the pusher flange is threadedly attached to the outer surface of the body barrel portion.

12. A vessel including a wall having a hole formed therethrough, and a hollow fitting assembly installed with a pressure-tight seal in the hole for connection to an external member, the hollow fitting assembly comprising:

a hollow body element including a body flange portion bearing against a first side of the wall, with a seal ring disposed between the body flange portion and the first side, the seal ring extending around the hole, the hollow body element further including hollow body barrel portion extending through the hole from the body flange portion;

a pusher flange attached to an outer surface of the body barrel portion;

a force-distributing washer disposed between the pusher flange and a second side of the wall, with a first face of the washer facing the second side, and a second face of the washer facing away from the second side;

jack bolts threadedly secured within internally threaded apertures of the pusher flange, with free ends of the jack bolts pushing the washer against the second side, and with threaded portions of the jack bolts forcing the pusher flange away from the vessel to pull the body flange portion toward the first side for compressing the seal ring to create a pressure-tight seal around the hole;

wherein the pusher flange is connected to the outer surface of the body barrel portion by a retaining ring mounted in a groove formed in the outer surface of the body barrel portion.

13. A vessel including a wall having a hole formed therethrough, and a hollow fitting assembly installed with a pressure-tight seal in the hole for connection to an external member, the hollow fitting assembly comprising:

a hollow body element including a body flange portion bearing against a first side of the wall, with a seal ring disposed between the body flange portion and the first side, the seal ring extending around the hole, the hollow body element further including hollow body barrel portion extending through the hole from the body flange portion;

a pusher flange attached to an outer surface of the body barrel portion;

a force-distributing washer disposed between the pusher flange and a second side of the wall, with a first face of the washer facing the second side, and a second face of the washer facing away from the second side;

jack bolts threadedly secured within internally threaded apertures of the pusher flange, with free ends of the jack bolts pushing the washer against the second side, and with threaded portions of the jack bolts forcing the pusher flange away from the vessel to pull the body flange portion toward the first side for compressing the seal ring to create a pressure-tight seal around the hole;

wherein the pusher flange comprises a ring mounted in a groove formed in the outer surface of the body barrel portion.

* * * * *